United States Patent [19]
Hassler, Jr.

[11] Patent Number: 6,157,115
[45] Date of Patent: Dec. 5, 2000

[54] MECHANICAL AMPLIFIER

[75] Inventor: William L. Hassler, Jr., Amherst, Ohio

[73] Assignee: Nordson Corporation, Westlake, Ohio

[21] Appl. No.: 09/170,555

[22] Filed: Oct. 13, 1998

[51] Int. Cl.[7] .................................................. H01L 41/08
[52] U.S. Cl. ........................................................ 310/328
[58] Field of Search ............................... 310/328; 74/110, 74/519

[56] References Cited

U.S. PATENT DOCUMENTS

| | | | |
|---|---|---|---|
| 2,275,256 | 3/1942 | Fried ........................................ | 310/328 |
| 3,649,857 | 3/1972 | Knappe ................................. | 310/328 X |
| 4,613,782 | 9/1986 | Mori et al. ........................... | 310/328 X |
| 4,769,569 | 9/1988 | Stahlhuth ............................... | 310/328 |
| 4,933,591 | 6/1990 | Stahlhuth ............................... | 310/328 |
| 4,952,835 | 8/1990 | Stahlhuth ............................... | 310/328 |
| 4,976,553 | 12/1990 | Yamaguchi et al. ................. | 310/328 X |
| 5,040,567 | 8/1991 | Nestler et al. .......................... | 137/625 |
| 5,076,314 | 12/1991 | Ikehata et al. ............................. | 137/82 |
| 5,094,429 | 3/1992 | Dostert ................................ | 251/129.06 |
| 5,328,149 | 7/1994 | Reuter ................................. | 251/129.06 |
| 5,720,417 | 2/1998 | Wurth et al. ........................... | 222/146.5 |
| 5,942,837 | 8/1999 | Reuter ...................................... | 310/328 |
| 5,946,969 | 9/1999 | Munekata et al. ................... | 310/328 X |

FOREIGN PATENT DOCUMENTS

| | | |
|---|---|---|
| 94 05 600 U | 7/1994 | Germany . |
| 4325143 C1 | 12/1994 | Germany . |
| 195 21 478 C1 | 9/1996 | Germany . |
| WO 95/03894 | 2/1995 | WIPO . |

OTHER PUBLICATIONS

Synthesis and Processing of Intelligent Cost Effective Structures, Feb. 1995.
Monolithic Multilayer Actuators, CeramTec, prior to Oct., 1998.
Japanese Patent Office, Patent Abstracts of Japan, Publication No.: 09141865 A. Date of publication of application: Mar. 6, 1997.

*Primary Examiner*—Mark O. Budd
*Attorney, Agent, or Firm*—Calfee, Halter & Griswold, LLP

[57] ABSTRACT

A mechanical amplifier has an elongated beam rotatable about a virtual pivot point in an amount proportional to the displacement of an actuator connected to the amplifier. A pair of ceramic multilayer piezoelectric actuators apply forces to opposite sides of the elongated beam causing rotation of the beam about the virtual pivot point in an amount proportional to the displacement of the actuators. In addition, a pair of flexures are connected to the opposite sides of the beam and to a frame. The frame functions as a substantially non-vibrating mechanical ground. The shape of the mechanical amplifier elements including the flexures, the beam and connectors for the flexures and actuators are designed to substantially maintain the virtual pivot point of the beam under load conditions within or near an area defined by the intersection of the axes of the flexures and the actuator forces.

44 Claims, 12 Drawing Sheets

MECHANICAL AMPLIFIER

FIELD OF THE INVENTION

The present invention relates to mechanical amplifiers which are used with any device or in any system that controls the position of or the force applied to an object, for example flow control devices. More particularly, the invention relates to a lever arm mechanical amplifier which is driven by a multilayer ceramic piezoelectric actuator and which has an output displacement under load conditions that is proportional to the input displacement of the actuator.

BACKGROUND OF THE INVENTION

Many types of mechanical devices have been developed over the years that control the position of or the force applied to an object. For example, conventional flow control devices open or close a valve in response to an external signal to permit or prevent the passage of a fluid. In the most typical situation, the valve is connected to a rod or piston which moves in response to the external signal and which in turn seats or unseats the valve. These standard flow control devices are operated manually or by connection to a solenoid, a motor, a piezoelectric device or any other type of well known actuators. These actuators convert an applied electrical drive signal into an output displacement to operate the valve. Those actuators that have a sufficient output displacement to reliably operate the valve are relatively large and heavy such as proportional solenoids.

Many flow control devices are mounted on a mechanical robot arm for use in numerous manufacturing or assembly operations, such as spraying material onto a part or applying adhesives, sealants, caulks or other material onto a part. The robot arm must fit into relatively small places and any component placed on the cantilevered arm acts as a downward weight that restricts the length and mobility of the arm. Therefore, the size and weight of the component, for example the flow control device, is an important design issue. Smaller and lighter actuators, such as a multilayered ceramic piezoelectric device formed by a laminated series or stack of piezoelectric ceramic layers separated by a conductive film, have a small displacement, typically about 0.001 inches and a high output force, typically in the range of 300 pounds. This small displacement is frequently insufficient to reliably operate a flow control device. In order to increase the output displacement to a sufficient level, a mechanical amplifier can be used to convert the high output force of the multilayered piezoelectric actuator into an output displacement that is greater than the output displacement of the actuator itself. Of course, the amplified output displacement must be achieved under operating conditions when the mechanical amplifier is connected to the flow control device. The addition of the mechanical amplifier to the multilayered piezoelectric actuator increases the overall size and weight of the flow control device with the attendant drawbacks or disadvantages described above.

It is desirable, therefore, to have a small, lightweight mechanical amplifier that provides an output displacement that is greater than the output displacement of the input actuator. Of course, such a mechanical amplifier has other advantages and benefits when used with the other mechanical devices referred to above. However, since these mechanical devices are so numerous, it is not practical to describe herein all the advantages and benefits of such a mechanical amplifier used with these devices.

SUMMARY OF THE INVENTION

The present invention relates to a mechanical amplifier having an elongated beam rotatable about a virtual pivot point in an amount proportional to the displacement of an actuator connected to the amplifier. In the preferred embodiment, a pair of ceramic multilayer piezoelectric actuators apply forces to opposite sides of the elongated beam causing rotation of the beam about the virtual pivot point in an amount proportional to the displacement of the actuators. In addition, a pair of flexures are connected to the opposite sides of the beam and to a frame. The frame functions as a substantially non-vibrating mechanical ground. The shape of the mechanical amplifier elements including the flexures, the beam and connectors for the flexures and actuators are designed to substantially maintain the virtual pivot point of the beam under load conditions within an area defined by the intersection of the axes of the flexures and the actuator forces. Design configurations and amplifier performance as to stability of the virtual pivot point can be analyzed and verified using standard finite element analysis (FEA) as is well known by those of ordinary skill in the art. In the preferred embodiment, the mechanical amplifier provides an output displacement of the elongated beam significantly greater than the output displacement of the actuators making the mechanical amplifier useful with a great number of devices or systems that control the position of or the force applied to an object. As an alternative, the mechanical amplifier can provide an output displacement of the elongated beam significantly less than the output displacement of the actuators by applying the design principles described hereafter thereby making the mechanical amplifier useful in micro-motion applications involving dynamic loads and displacements substantially less than 0.001 inches. One example of a micro-motion mechanical drive is a very small position control for microscope stages. In addition, as would be understood by one of ordinary skill in the art, the amplifier can be used as a sensor or bidirectional amplifier.

The mechanical amplifier will be described in the specification as connected to flow control devices for dispensing fluids. However, it should be understood that the mechanical amplifier can be used with any appropriate device or system and is not limited to use with flow control devices. These and other aspects and advantages of the present invention will be apparent to those skilled in the art from the following description in view of the accompanying drawings.

BRIEF DESCRIPTION OF THE DRAWINGS

The invention may take physical form in certain parts and arrangements of parts, embodiments which will be described in detail in this specification and illustrated in the accompanying drawings which form a part hereof, and wherein.

DETAILED DESCRIPTION

Figure 1:
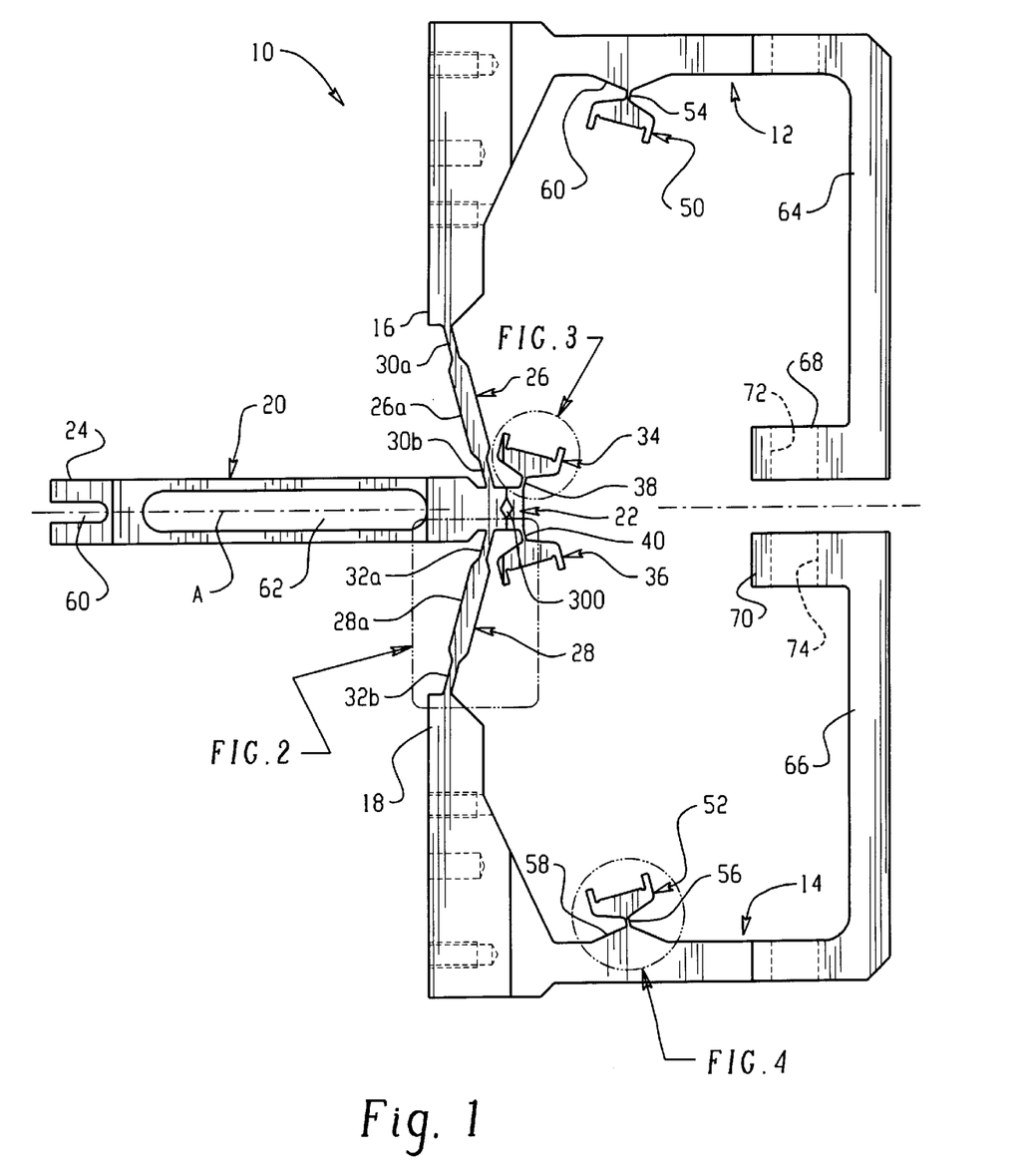
FIG. 1 is a plan view of a mechanical amplifier in accordance with one embodiment of the invention.

With reference to FIG. 1, the present invention is a mechanical amplifier that efficiently converts the large output drive force of an actuator such as a pair of multilayer ceramic piezoelectric actuators (shown in FIG. 6) into a useful displacement substantially greater than the small output displacement of the actuator, which typically is on the order of about 0.001 inches maximum. Although the invention is described herein with specific reference to use of the amplifier with a flow control device, such description is exemplary in nature and should not be construed in a limiting sense. The present invention will find application in any apparatus or system which controls the position of or force applied to an object and in particular to devices or systems using linear displacement actuators, such as multilayer ceramic piezoelectric actuators and in which it is desirable to convert the output force of the actuator into a useful displacement. However, it will be appreciated by those of ordinary skill in the art that any type of actuator that applies the appropriate forces to the amplifier can be used.

In the embodiments described herein, the useful displacement output of the mechanical amplifier is significantly greater than the output displacement of the actuators, however, it is within the scope of the present invention to make the useful displacement output of the mechanical amplifier significantly less than the output displacement of the actuators. As will be understood by those skilled in the art, this alternative output displacement is achievable by applying the principals and structure described hereinafter. Accordingly, the mechanical amplifier is useful with devices and systems involving micro-movement. In addition, as would be understood by one of ordinary skill in the art, the amplifier can be used as a sensor or bidirectional amplifier.

One example for use of the mechanical amplifier of the present invention is in conjunction with multilayer ceramic piezoelectric actuator which is used as an alternative to or replacement for a conventional proportional solenoid used to operate a fluid flow control device or valve. Proportional solenoids are relatively large, bulky and heavy devices. In a typical application, such as a mechanical robot arm for use in numerous manufacturing or assembly operations such as spraying material onto a part or applying adhesives, sealants, caulks and other material onto a part, the size and weight of the flow control device is an important consideration. The robot arm must fit into relatively small places and any component placed on the arm exerts a downward force or weight that restricts the length and mobility of the arm. A linear displacement actuator such as a multilayer ceramic piezoelectric being typically smaller and lighter than the proportional solenoid is a logical replacement. However, the output displacement of the multilayer ceramic piezoelectric actuator is typically insufficient to operate the flow control valve. The mechanical amplifier of the present invention coupled with the multilayered ceramic piezoelectric actuator provides an output displacement significantly greater than the output displacement of the multilayer ceramic piezoelectric actuator and sufficient to operate the control valve without adding significant weight or size. The mechanical amplifier of the present invention operates as a true amplifier and produces an output displacement that closely tracks the drive voltage frequency, amplitude and wave form. Thus, the multilayer ceramic piezoelectric actuator can be excited with a wide variety of excitation frequencies, amplitudes and wave forms, including square waves, sinusoids or triangular wave forms, for example, to achieve a desired output characteristic from the mechanical amplifier to operate the flow control device.

The amplifier 10 is a single integral structure formed of a stiff metal, such as 17-4 stainless steel. Of course any other material that exhibits the same or substantially the same physical characteristics can be used. The amplifier 10 is machined from a single block of steel using conventional metal forming techniques such as wire EDM, however, the amplifier 10 could be formed by any other well known conventional technique such as a metal injection molding. Wire cutting is preferred because this process can hold tolerances of about 0.001 inches or less. Dimensions and geometry including angles and radiuses are set forth with reference to FIGS. 9–14 for completeness. These dimensions and geometric parameters are exemplary in nature and those skilled in the art will appreciate that changes in material, geometry and dimensions can be made without departing from the scope of the present invention and that changes in these parameters will alter the operation and performance of the amplifier. Of particular importance to the operation and performance of the amplifier are the dimensions and geometry of the flexure arms, the displacement beam and the various connector webs that join the flexure arms and displacement beam (these elements will be described in detail hereinafter). Thus, the amplifier 10 design is largely application specific, with required dimensions being determined by the operational performance required of the amplifier. Finite element analysis is a preferred method for evaluating the amplifier 10 design and expected performance.

The amplifier 10 includes a first bracket or frame section 12 and a second bracket or frame section 14. The bracket sections 12 and 14 function as substantially non-vibrating mechanical grounds for the amplifier 10. The bracket sections 12 and 14 are substantially mirror images of each other. However, it will be appreciated by those of ordinary skill in the field that the bracket sections 12 and 14 could have any other general shape, provided that they perform the substantially non-vibrating mechanical ground function. In addition, the bracket section 12 could have a different shape than bracket section 14 and still be within the scope of the present invention. The first bracket section 12 has a first end 16 and the second bracket section 14 has a first end 18, both ends 16, 18 are joined to an elongated displacement beam or bar 20. The beam 20 has a first or driven end 22 and a second or load end 24. When a force is applied to the driven end 22, the load end 24 is displaced due to pivoting motion of the beam 20, as will be further described hereinafter. The displacement at the load end 24 is an amount proportional to the displacement at the driven end 22. The driven end 22 displacement is produced by a pair of small displacement actuators (not shown) in response to an electrical excitation signal. The beam 20 lies along a longitudinal axis A.

Figure 1A:
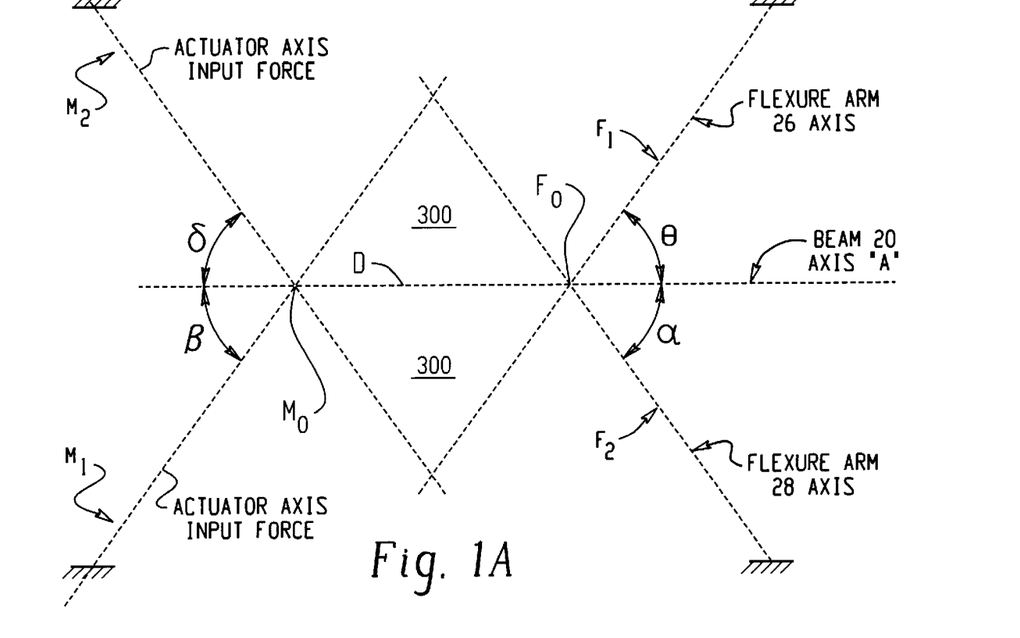
FIG. 1A is a model of the mechanical amplifier of FIG. 1 illustrating certain geometric relationships, alignments and a virtual pivot point region.
Figure 2:
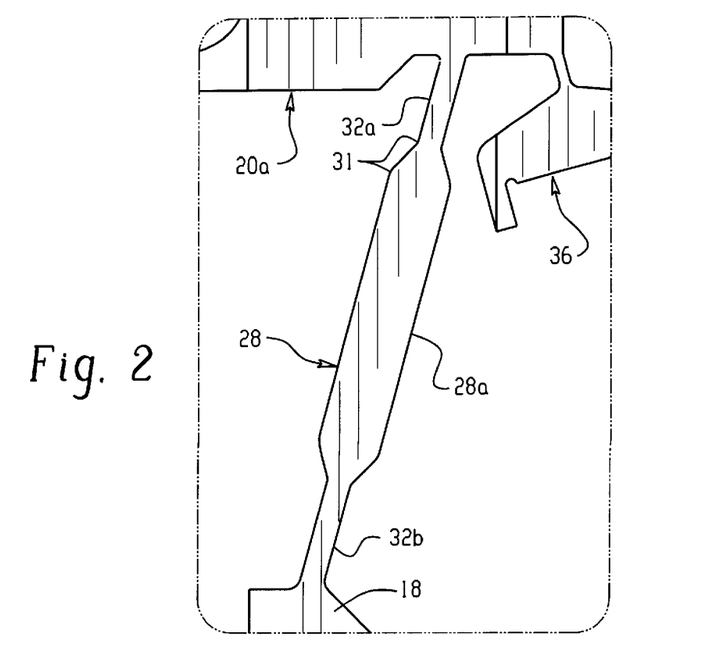
FIG. 2 is a detailed illustration of a flexure arm used in the amplifier of FIG. 1.

Each bracket section end 16, 18 is joined to opposite sides of the beam 20 by a respective flexure arm 26, 28. FIG. 2 illustrates the preferred embodiment of the flexure arm 28 design in greater detail, flexure arm 26 is substantially the same in configuration. Each flexure arm 26, 28 defines a longitudinal axis, respectively axis $F_1$ and $F_2$ (as shown in FIG. 1a), each of which form an included acute angle with the axis A of the beam 20. Each flexure arm 26, 28 forms an angle of 75° with the beam 20 axis A. The flexure arm 28 has a central body 28a and a pair of connector webs 32a and 32b. The central body 28a is joined to the second bracket end 18 and to the beam 20 by the pair of connector webs 32a, 32b. Similarly, the flexure arm 26 has a central body 26a that is joined to the first bracket end 16 and to the beam 20 by a pair of connector webs 30a, 30b (FIG. 1). The connector webs 30, 32 are relatively thin compared to the central bodies 26a, 28a.

The connector webs 32a, 32b (and also 30a, 30b) are joined to the central body 28a (26a in the case of the second flexure arm) by curved contours 31 as noted in FIG. 2 to eliminate stress accumulation or concentration The connector webs 30a and 32b are also joined by curved contours to the bracket ends 16, 18 respectively (FIG. 1). Curved contours are also used to join the flexure arm connector webs 30b and 32a to the beam 20.

Figure 3:
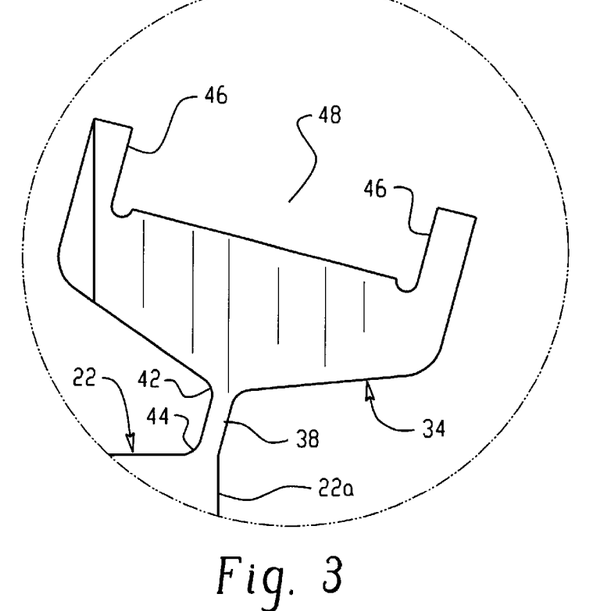
FIG. 3 is a detailed illustration of a mounting pad used in the amplifier of FIG. 1.

A pair of mounting pads 34, 36 are joined to the driven end 22 of the beam 20. The pads 34, 36 have respective connecting webs 38, 40 which each lie on an axis respectively $M_1$ and $M_2$ (as shown in FIG. 1A) each of which forms an included acute angle with the beam 20 axis A. Details of the pad 34 are shown in FIG. 3. Of course, pad 36 is substantially the same and accordingly not described in detail. The pad connectors 38, 40 are joined flush with an end wall 22a of the beam driven end 22 and form respective acute angles of 75° with the beam 20 longitudinal axis A. The connector 38 is relatively thin compared to the overall size of the pad 34 and is joined to the pad 34 by a radius contour 42 and to the beam 20 by a radius 44. The pad 34 is somewhat cup shaped to form sidewalls 46. Thus, the pad provides a recess 48 that receives one end of an actuator (as will be described hereinafter).

It will be noted that the mounting pads 34, 36 join the beam 20 driven end 22 on opposite sides thereof. In this manner, the actuators which drive the beam 20 operate in a "push/pull"manner. In this embodiment, the actuators are alternately excited so as to impart a pivoting action to the beam 20.

Each of the pads 34, 36 has an associated aligned pad 50, 52. Thus mounting pads 34 and 50 are aligned with each other, with the pad 50 being joined to the first bracket section 12. The mounting pad 50 is joined to the bracket section 12 by another relatively thin connector web 54. In a similar manner, the mounting pad 52 is aligned with the pad 36 and is joined to the second bracket section 14 by a relatively thin connector web 56. Thus, pads 34 and 50 form a pair of first and second mounting pads that are aligned to receive and retain a first multilayer ceramic piezoelectric actuator and pads 36 and 52 form a second pair of third and fourth mounting pads that receive and retain a second multilayer ceramic piezoelectric actuator (actuators not being shown in FIG. 1). The first pair of pads 34, 50 align on a first actuator axis and the second pair of pads 36, 52 align on a second actuator axis. The first and second actuator axes are collinear respectively with the axes $M_1$ and $M_2$ and accordingly also form an acute angle with the beam 20 longitudinal axis A. Accordingly, the actuators are aligned at an angle of 75° with respect to the beam 20 axis A.

Figure 4:
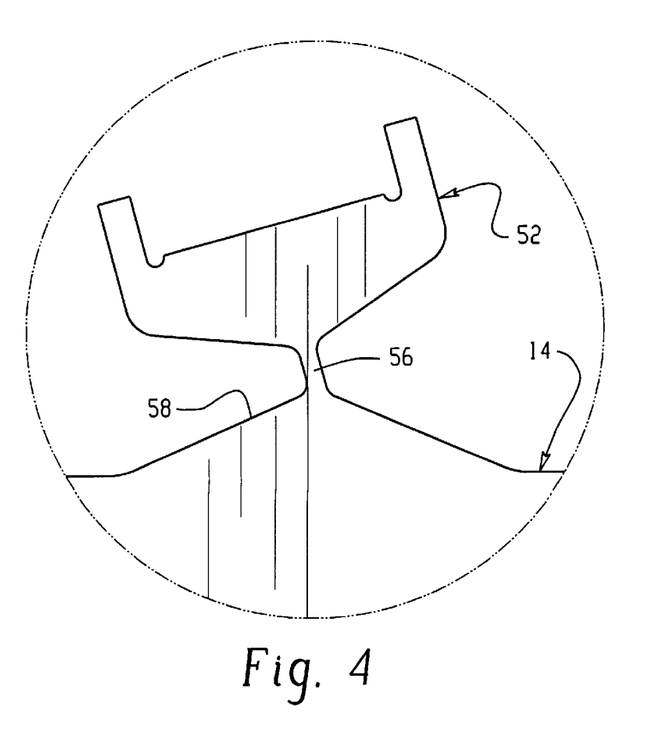
FIG. 4 is a detailed illustration of a bracket mounting pad used in the amplifier of FIG. 1.

FIG. 4 illustrates the detail of the bracket mounted actuator pads, in this case pad 52. The mounting pad 52 is cup shaped in a manner similar to the beam mounted pad 34 (FIG. 3). The mounting pad 52 connector web 56 is joined to the second bracket section 14 at a somewhat triangular raised surface portion 58 of the bracket section 14. The substantially same configuration is used on the first bracket side (surface 60 in FIG. 1).

With reference again to FIG. 1, it will be noted that the flexure arms 26, 28 join the beam 20 on opposite sides of the beam 20 in a manner similar to the mounting pads 34, 36. Furthermore, the arms 26, 28 join the beam 20 at a location that is axially spaced from the beam driven end 22. Thus, the beam 20 pivots in response to forces applied to the end 22 of the beam by the actuators. The pivot action is referred to herein as occurring at a virtual pivot point within or near a "pivot region" because the pivot point is not completely stationary even under a no load condition. However, the virtual pivot point is substantially fixed since it only moves within or near to the pivot region. With reference to FIG. 1A, the pivot region 300 is defined as the area on the beam 20 lying within the intersection of the axes $F_1$ and $F_2$ of the flexures 26 and 28 and the axes $M_1$ and $M_2$ of the mounting pads 34 and 36 and, of course, the collinear axes of the multilayer ceramic piezoelectric actuators. Under no load conditions the pivot point starts at the point $F_0$ or the point on the beam where the longitudinal axes $F_1$ and $F_2$ of the flexure arms intersect. It is possible that the virtual pivot point may move outside the pivot region 300 but remain near the pivot region 300 such as to the right of the point $F_0$ as viewed in FIG. 1A and the benefits and advantages of the present invention can still be substantially achieved. By "near" is meant the distance that the virtual pivot point can move from $F_0$ before the amplifier 10 becomes unstable. By "unstable" is meant that the output displacement is no longer substantially proportional to the input displacement. In the preferred embodiment, the term "near" is equal to five times the distance D in either direction from $F_0$ on the beam axis A. "D" is the distance, identified on FIG. 1A, between the points $M_0$ and $F_0$ on the beam axis. The virtual pivot point has a tendency to move when the amplifier 10 is under operating conditions and a force or load is applied to the load end 24 of the beam. The designs described and illustrated herein and other amplifier configurations that embody the basic concepts of the present invention, however, achieve an effect whereby even under a substantial load, for example a five pound transverse load applied to the load end of the beam 20, the virtual pivot point does not move a large amount, but rather is stable or fixed within or near the pivot region 300. This assures that even under a high load the amplifier 10 will still exhibit substantial displacement gain.

With the use of stainless steel and the construction described and illustrated, the amplifier 10 exhibits a high natural frequency of about 1350 hertz. Preferably the natural frequency will be about 1000 hertz but lower natural frequencies may be used in some applications. A natural or resonant frequency above 1000 hertz is useful in many applications. If the resonant frequency of the beam 20 is too low, it would be difficult to achieve a wide range of excitation frequencies and output from the beam 20. Since the stiffness of the amplifier 10 determines in part the natural frequency, those skilled in the art will appreciate that the longer the beam 20 is made, the lower will be the natural frequency. However, a longer beam 20 produces greater output displacement amplification. Thus, for any particular application there will be a design trade off of gain versus natural frequency. If the natural frequency is too low, the amplifier will be less able to accommodate higher frequency dynamic loads. If the amplifier 10 is too stiff (e.g. too high a natural frequency) the amplifier will have a lower output displacement gain.

Since the gain or mechanical advantage of the mechanical amplifier is a function of the length of the beam, the amount of output displacement or rotation of the beam y by one actuator (for small angles of rotation) is:

$$y = L_B/L_{vp} \times Da$$

where $L_B$ is the length of the beam measured from the virtual pivot point to the point on the beam contacting the load, and $L_{vp}$ is the length from the virtual pivot point to the point $M_0$ on the beam where the actuator axes M1 and M2 intersect; and Da is the output displacement of one of the multilayer ceramic piezoelectric actuators.

Accordingly the gain or mechanical advantage of the mechanical amplifier is $$G \cong L_B/L_{vp}$$

These calculations assume that the pivot point is stationary. Since in practice the virtual pivot point moves, the calculated values of $L_B$ and $L_{vp}$ change and therefore are dynamic values. The calculated gain G is also therefore a dynamic value. It is thus apparent that the stability of the operational gain G of the amplifier 10 is dependent on achieving an amplifier design that has a pivot point that is stable or fixed within a small region. For example, if the virtual pivot point moves towards the load end of the beam, the gain will drop, and if the pivot point moves towards the driven end of the beam the gain will increase.

The displacement beam 20 includes a notch 60 (FIG. 1) at the load end 24. This notch 60 is sized to accommodate a valve actuator device such as a valve stem, for example, or any other member that is to be driven by the beam 20. It has also been found to be advantageous to mill out a recess 62 on both sides of the beam 20 to reduce the mass of the beam without reducing its stiffness in order to increase the amplifier's natural frequency.

Figure 5:
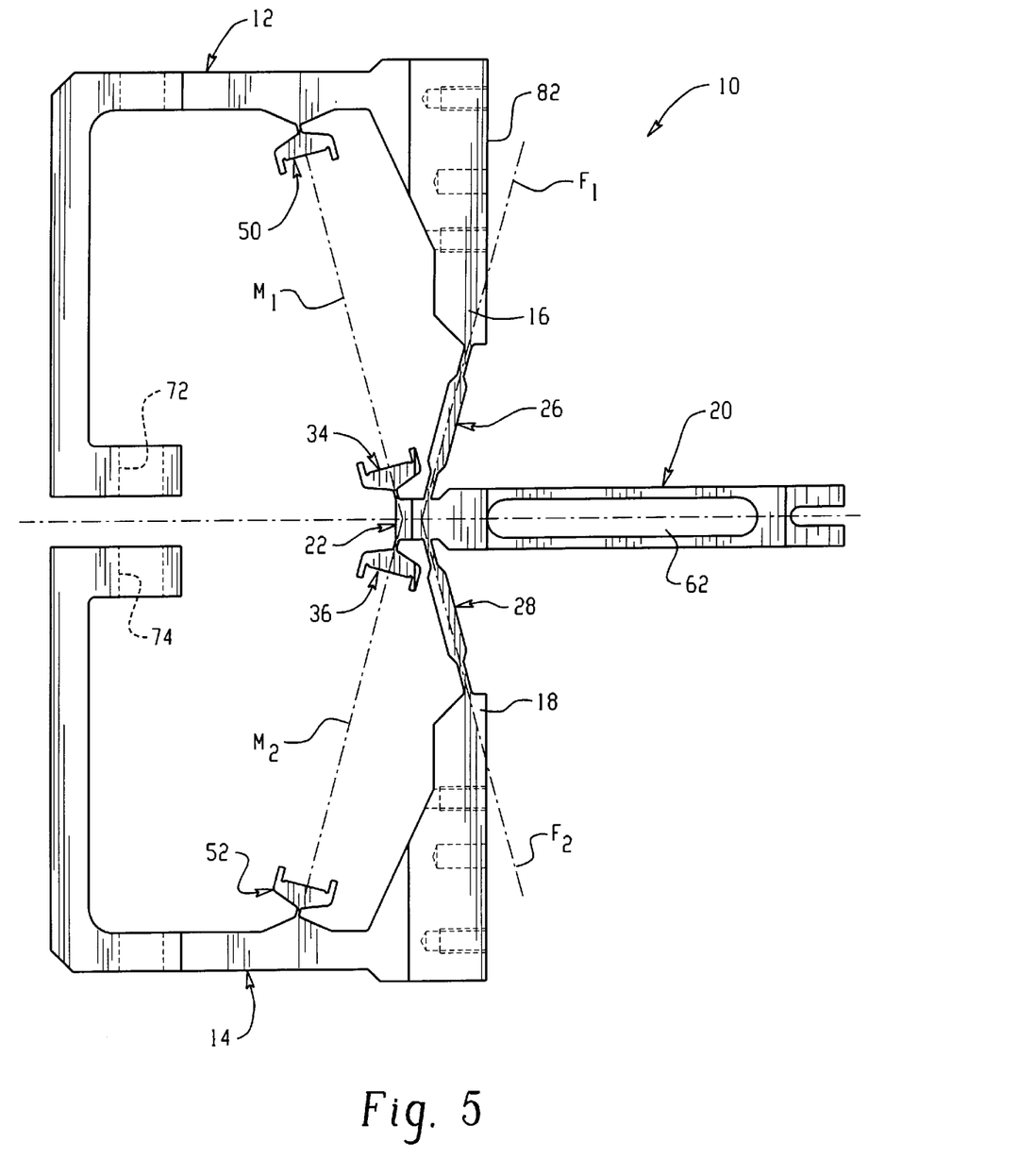
FIG. 5 is a reverse plan view of the amplifier of FIG. 1.
Figure 6:
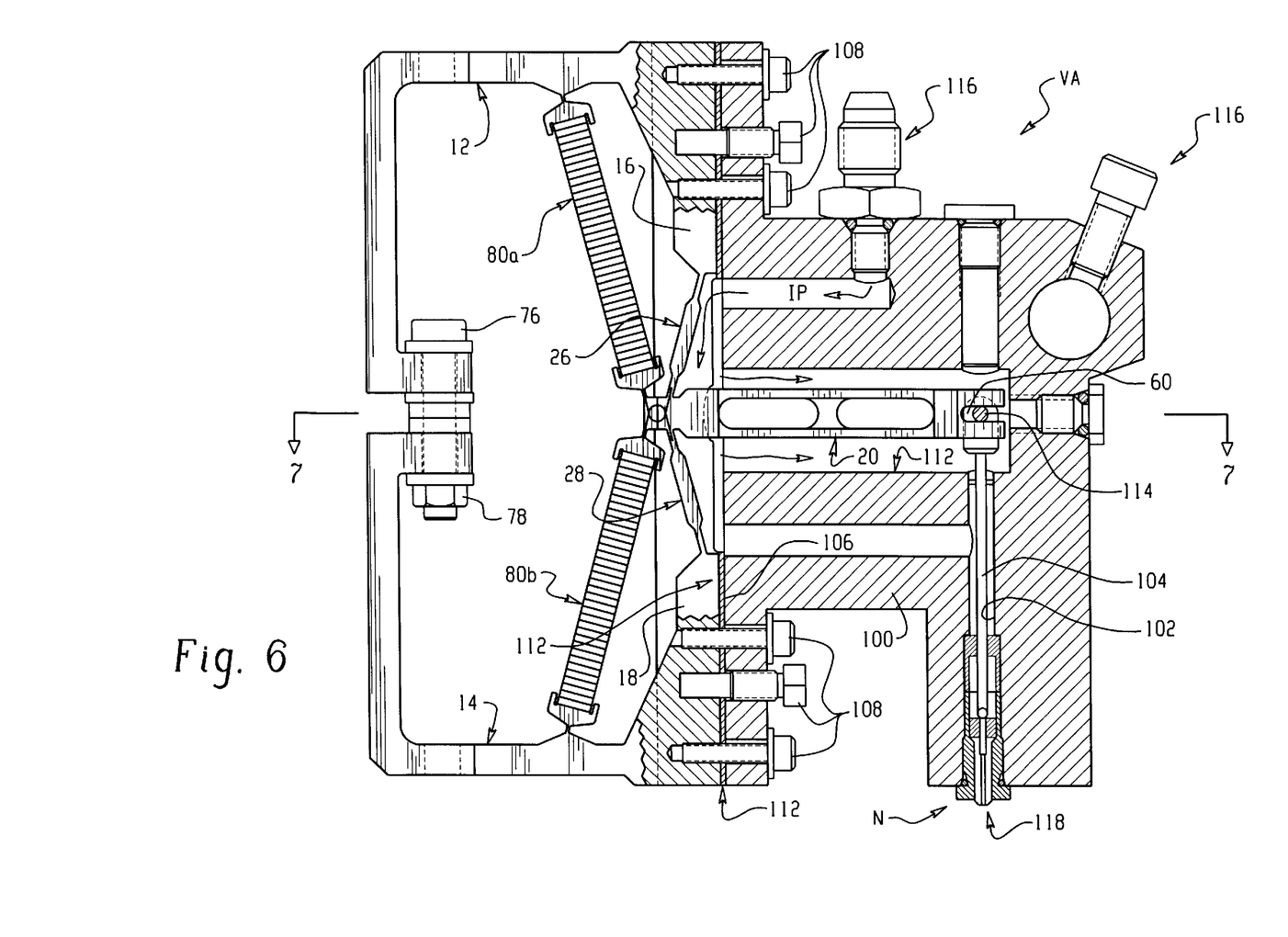
FIG. 6 illustrates use of the mechanical amplifier of FIG. 1 with a pair of multilayer ceramic piezoelectric actuators in a typical application with a flow control device.

Each bracket section 12, 14 includes respective extensions 64, 66. Each extension 64, 66 includes an inwardly extending flange 68, 70. FIG. 5 illustrates in plan the amplifier 10 from the reverse side as is shown in FIG. 1. The flanges 68, 70 include respective through holes 72, 74 which are sized to receive a clamping bolt 76 and nut 78 assembly (FIG. 6). When the bolt 76 and nut 78 are tightened down, the flanges 68, 70 are pulled towards each other, and in this manner the compression force on the actuators is adjusted. The multilayer ceramic piezoelectric actuators must be held in compression during operation as is well known in the art.

It will be appreciated by those skilled in the art that the bracket sections 12, 14 function as mechanical grounds (no vibration) at the locations where the mounting pads 50, 52 join the bracket sections and also at the location where the flexure arms 26, 28 join the bracket ends 16, 18. Thus, the present invention is not limited to the use of a bracket or frame configuration such as illustrated in the preferred embodiment herein. Any rigid structure or body can be used for the bracket sections in order to provide a mechanical ground reference for the flexure arms and the actuator mounting pads.

With reference to FIG. 6, the amplifier 10 is shown with the multilayer ceramic piezoelectric actuators 80a and 80b installed and with the amplifier 10 connected to a fluid flow control device or valve assembly VA. A suitable device for the actuators 80a and 80b is part no. 20B available from Sumitomo.

In this exemplary embodiment, the valve assembly VA includes a valve body 100 with a bore 102 therein that slideably receives a needle 104 that is part of a ball and seat valve mechanism N. The displacement beam 20 extends through a central bore 112 in the valve body 100. A pin 114 is positioned within the beam notch 60 so that displacement of the load end 24 of the beam 20 causes corresponding motion of the needle 104. A valve inlet 116 provides a source of fluid to the valve assembly VA through an inlet passage IP to the central bore 112 and out the valve bore 102, the flow of which is controlled by operation of the needle valve N in response to the amplifier 10 output displacement. The flow of fluid from the valve outlet 118 is thus controlled. Of course, the valve assembly described above is intended to be general in nature and any other form of fluid flow control device could be used.

Figure 15:
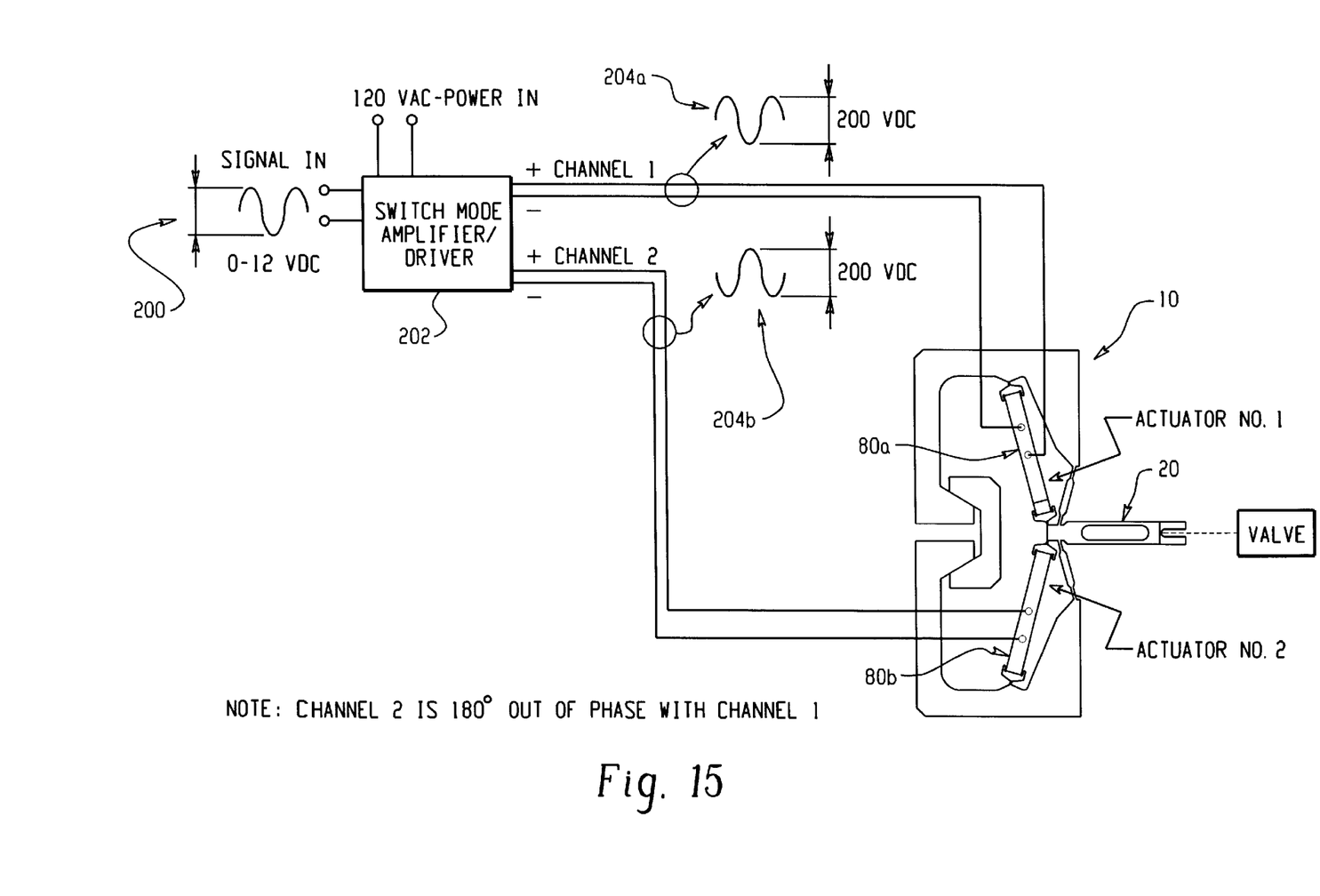
FIG. 15 is an electrical schematic of a suitable excitation circuit for use with the present invention of FIGS. 1–14.

A particular advantage of the high frequency operation of the amplifier 10 is that it can be used to achieve valve control substantially similar to a conventional proportional solenoid or servo valve. The displacement of the beam load end 24 closely follows the excitation wave form of the applied excitation signal for the actuators 80a and 80b. FIG. 15 illustrates schematically a suitable excitation method for the actuators 80a, 80b. In this embodiment, a sinusoidal input wave form 200 is applied to a switch mode amplifier 202. Line voltage, for example 120 VAC wall power is used as a power input to the amplifier 202. The amplifier 202 converts the input wave form, which in this example is a twelve volt peak to peak sinusoid, to a 200 volt peak to peak drive voltage 204 sinusoid. A first drive voltage 204a is coupled to one actuator 80a and a second drive voltage 204b is coupled to the second actuator 80b, as illustrated in FIG. 15. The drive voltages 204a and 204b are 180° out of phase with respect to each other in the embodiments herein; therefore the actuators are alternately driven. The design of the amplifier 202 may be conventional, and is well known to those of ordinary skill in the art.

Figure 7:
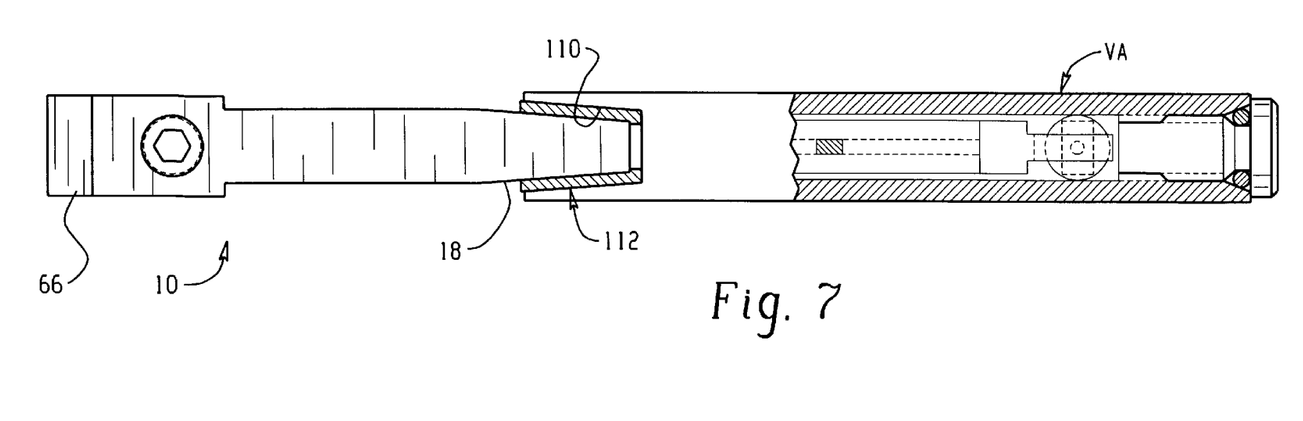
FIG. 7 is an elevation of the apparatus of FIG. 6.

The valve body 100 includes a flanged mounting face 106 that is attached to a corresponding mounting face 82 (FIG. 5) of the amplifier 10. Suitable bolts 108 are used to secure the amplifier 10 and valve body 100 together. As best illustrated in FIG. 7, the first and second bracket ends 16, 18 of the amplifier 10 (only end 18 is viewed in FIG. 7) are wedge shaped to easily insert into a correspondingly contoured recess 110 of the valve body 100. A gasket 112 made of any suitable elastomeric material that is compatible with the fluid in the valve assembly VA seals the interface between the amplifier 10 and the valve assembly VA. The gasket material may be, for example, Viton. The gasket 112 in an unassembled state is a thin flat web of the elastomer, and this web is then folded over the wedge-shaped ends 16, 18 of the amplifier 10. Holes are provided in the gasket to accommodate fluid flow from the passage IP to the central passage 102, and further to accommodate the bolts used to secure the amplifier 10 to the valve body 100. Thus, a portion of the gasket 112 overlays and is in contact with the driven end 22 of the beam 20 and is also in contact with the flexure arms 26, 28. The amplifier 10 wedged ends 16, 18 are compressed tightly within the valve body recess 110 to form an effective seal, however, the compression of the gasket 112 against the flexure arm 26, 28 and the beam 20 does not adversely affect the amplifier 10 performance in part because of the substantial stiffness of the amplifier 10. To the contrary, the gasket 112 provides a mechanical dampening effect to somewhat reduce ringing of the amplifier, particularly under a no-load condition. Thus, the gasket has a dynamic seal function in that the flexure arms 26, 28 and the beam 20 are vibrating or moving, but these movements are so small that the gasket 112 in effect is a static seal for the assembly, thus permitting very high fluid pressures within the valve assembly VA.

Figure 8:
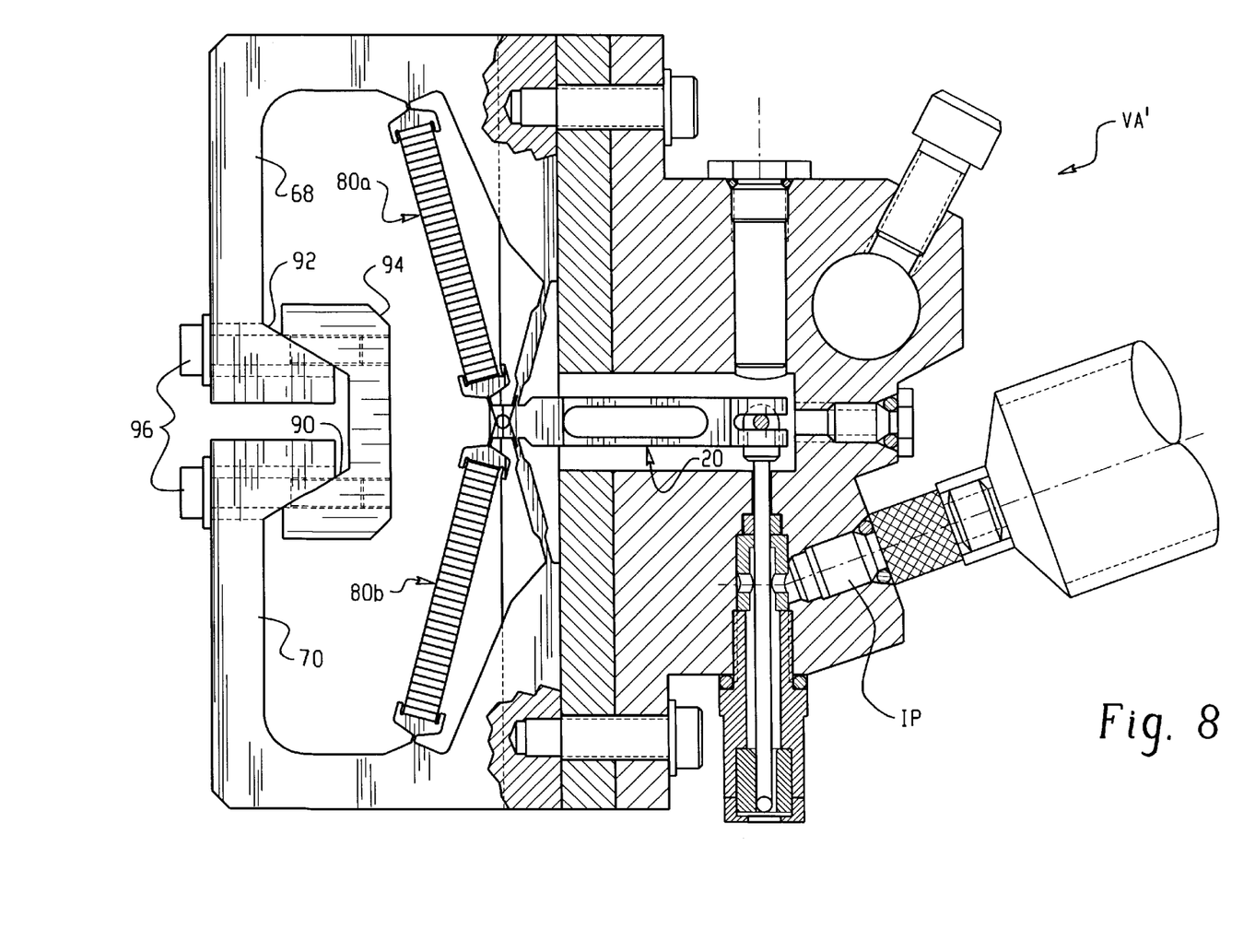
FIG. 8 illustrates an alternative embodiment of a clamp arrangement for use with the invention together with a pair of multilayer ceramic piezoelectric actuators in a typical application with a flow control device.
Figure 9:
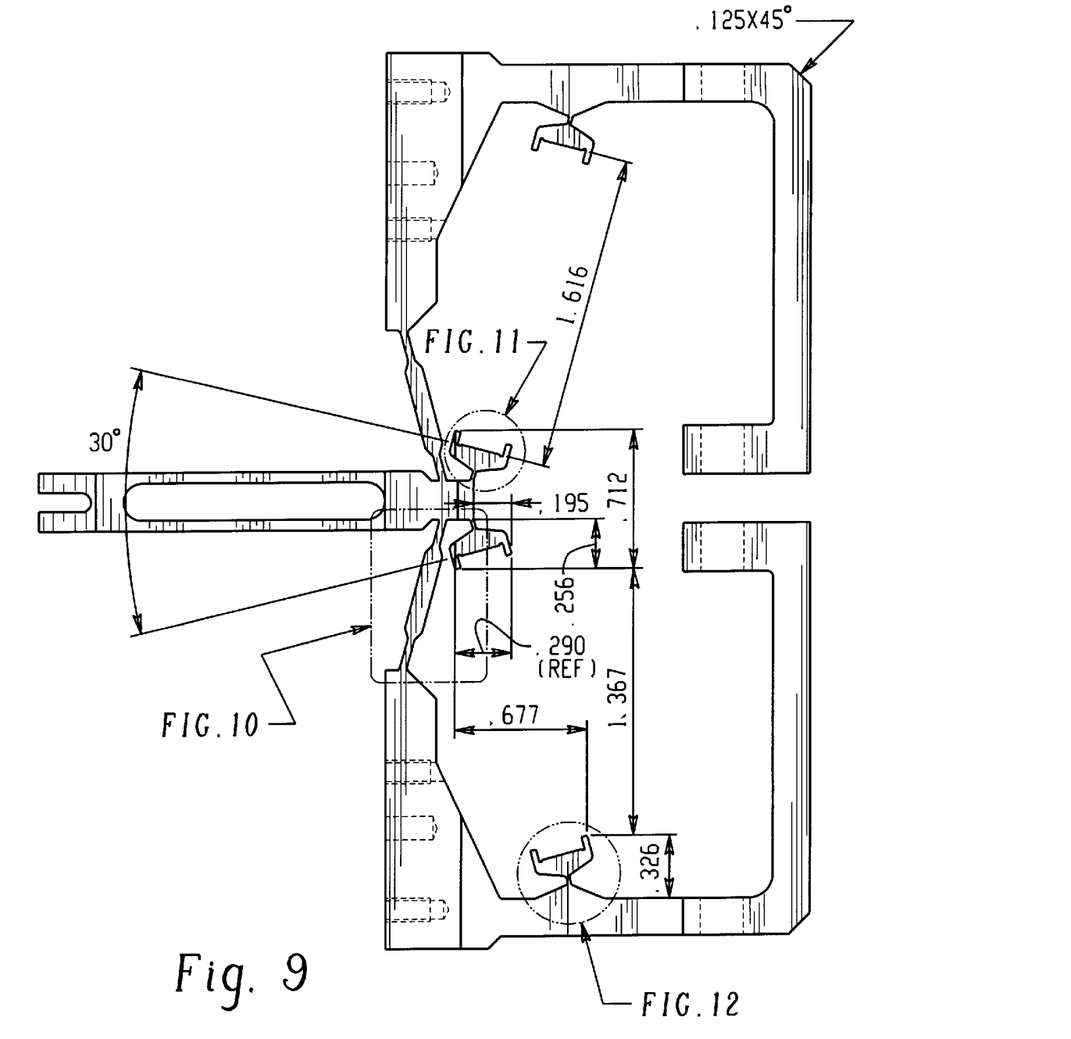
FIGS. 9–14 show the embodiment of FIGS. 1–5 with exemplary dimensions and geometry parameters.
Figure 10:
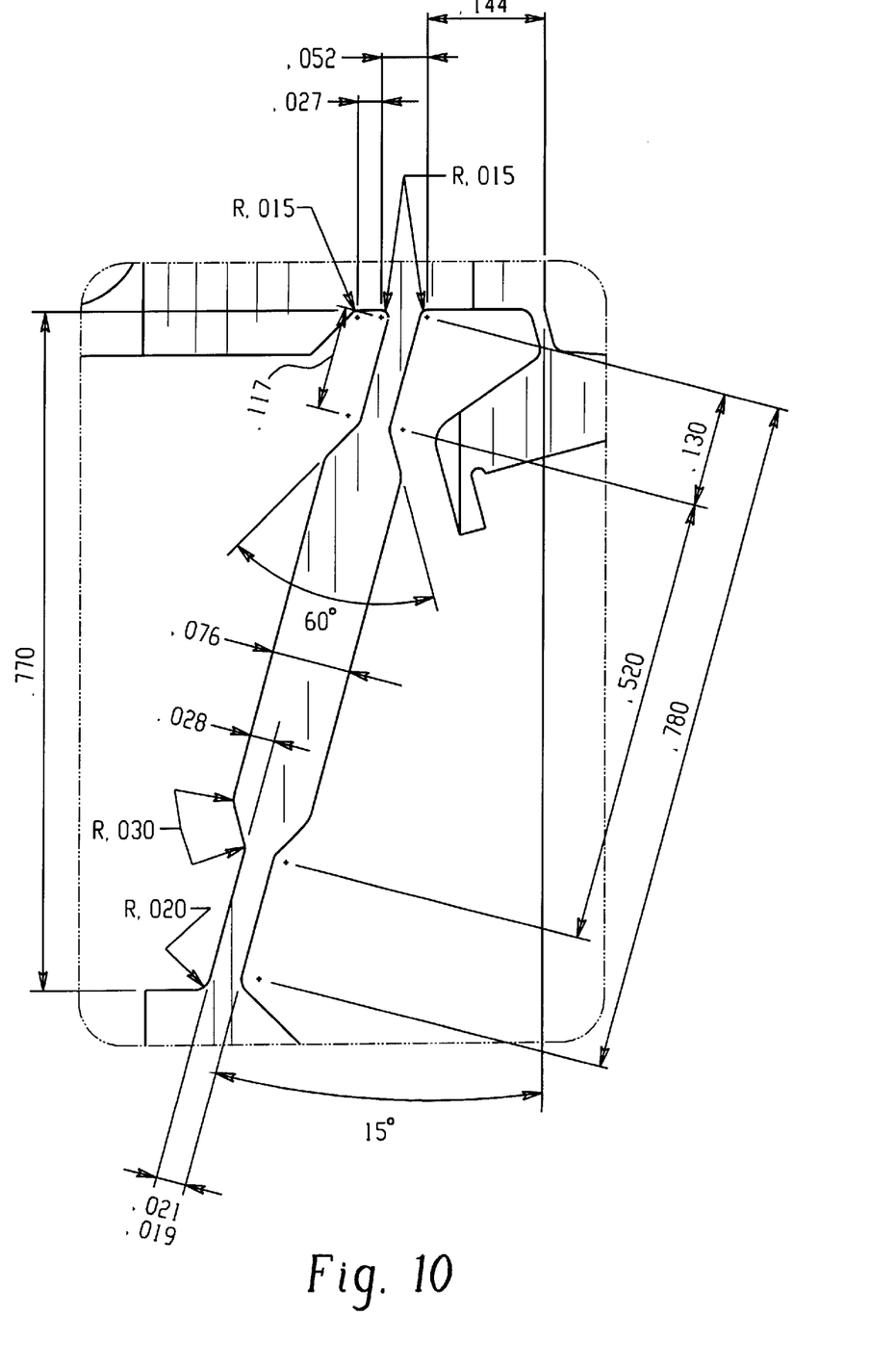
Figure 11:
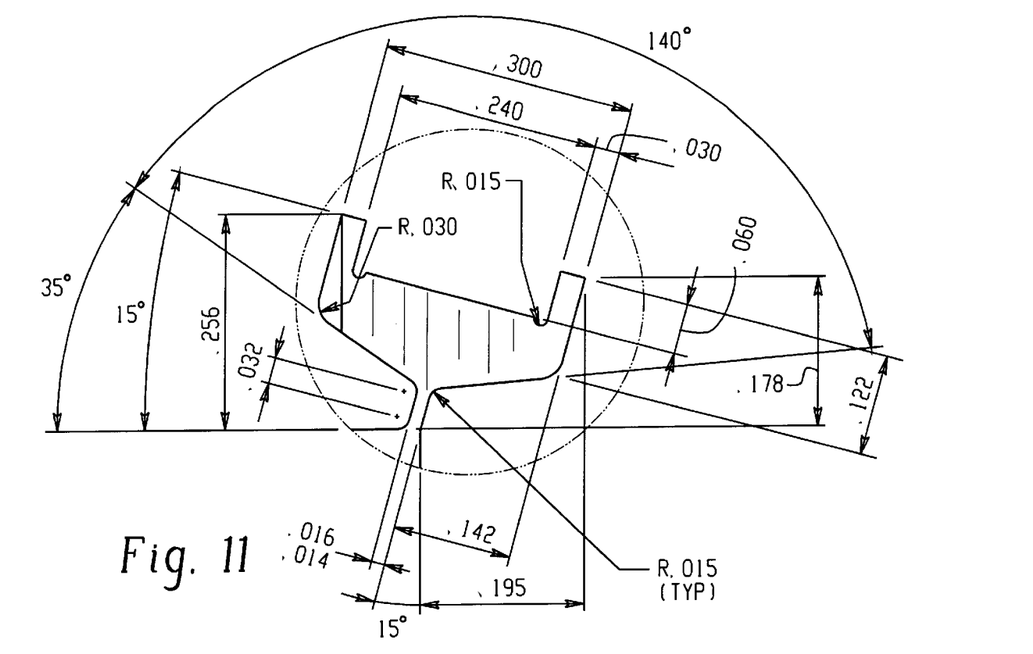
Figure 12:
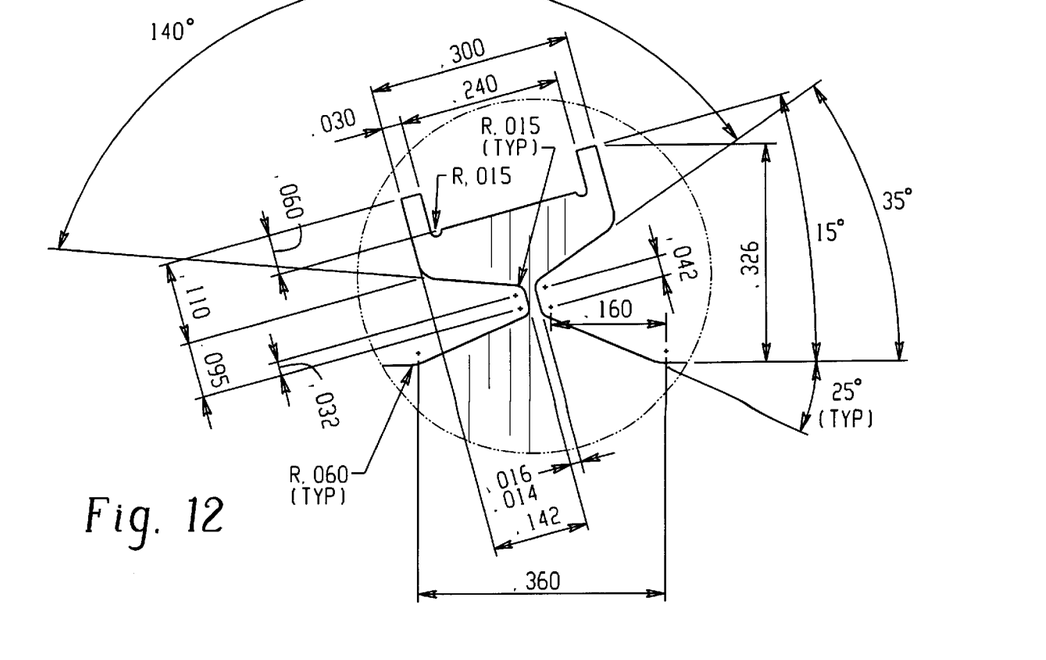
Figure 13:
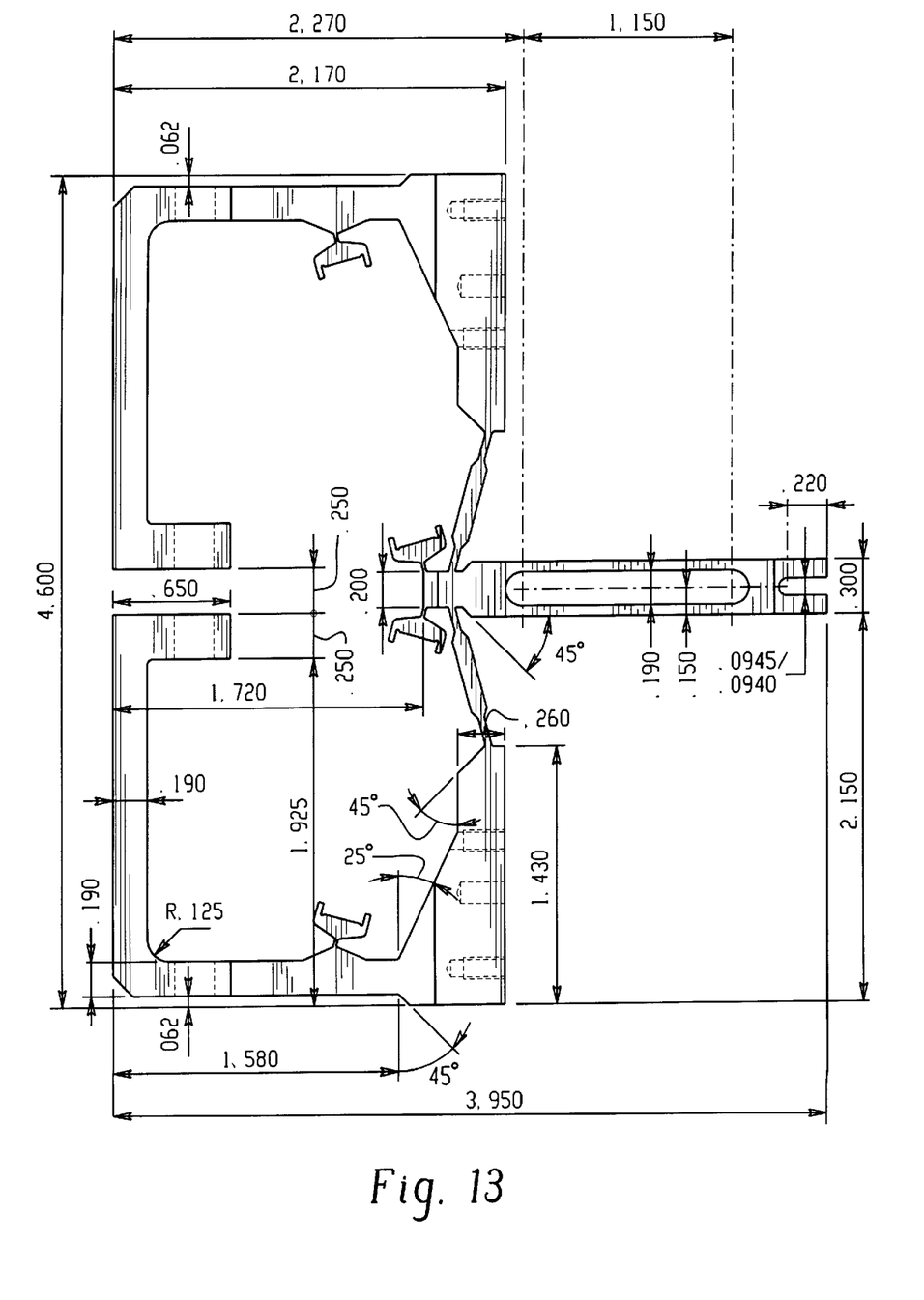
Figure 14:
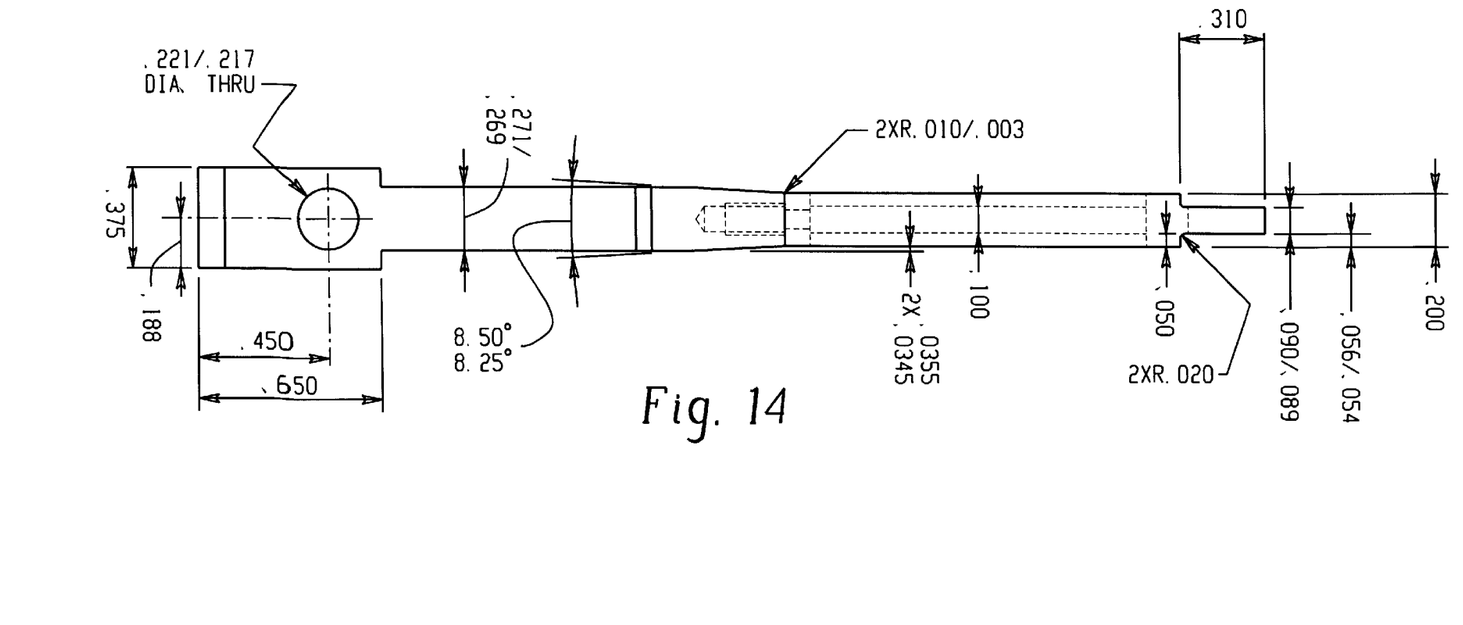

With reference to FIG. 8, an alternative embodiment for the bracket clamping arrangement is illustrated. In this embodiment, the bracket extensions 64, 66 include inwardly extending flanges 90, 92. Each flange 90, 92 has a tapered outer surface 90a, 92a (not shown) which taper towards each other as illustrated and function as a cam type surface with an increased mechanical advantage. A correspondingly tapered clamp 94 is pulled into engagement with the tapered surfaces 90a, 92a by a pair of bolts 96. As the clamp 94 is drawn up by the bolts 96, the flanged ends 90, 92 are drawn together, thus increasing the compression applied to the multilayered ceramic piezoelectric actuators 80a and 80b.

FIGS. 9–14 provide specific dimensions for the preferred but not exclusive embodiment of the invention. These dimensions are held to tight tolerances (such as by using a wire EDM cutting process) because operation of the amplifier 10 will vary with the geometry of the flexure arms 26, 28 and the connector webs 30, 32, 38, 40, 54 and 56 and the beam 20. For example, if the connector webs are too short or thick, the virtual pivot point will not be stable because too much excitation energy is coupled into the flexures. If the connector webs are too long or too thin, they can buckle and/or reduce the stiffness of the amplifier thus lowering its natural frequency. A design criteria is to minimize the amount of flexure arm 26, 28 angular deflection because such angular deflection causes changes in the virtual pivot point. With reference to FIG. 1A, it is also desirable that the relationships of the included angles $\alpha$, $\beta$, $\theta$ and $\delta$ be such that $\beta$ is substantially equal to $\delta$, $\beta$ is substantially equal to $\theta$ and $\delta$ is substantially equal to $\alpha$. These relationships help assure that the amplifier 10 is balanced on both sides of the beam, and further that each flexure arm 26, 28 exerts a reactive force that offsets non-pivoting forces applied by their respective opposite actuator 80a and 80b. By offsetting non-pivoting (for example, translational) forces, the pivot point will tend to be fixed within a relatively small area. The latter two relationships preferably apply in all cases. The first relationship is desirable and applies in cases where the application permits such a configuration of the amplifier. The actual values of these angles, 75° in the preferred embodiment, is chosen based on the overall profile and dimensions required for a particular application. For example, the amplifier will be narrower when $\delta$ and $\theta$ are made smaller.

It should be noted that the amplifier 10 works within selected ranges for the dimensions and geometry of the important parts including the flexure arms, connector webs and the beam. Thus, the example provided in FIGS. 9–14 is intended to be exemplary, but also within the context of understanding that changes in the amplifier configuration, for example to change the natural frequency or displacement gain characteristics, will involve finite element analysis or other suitable techniques to evaluate the impact of geometry changes to the overall performance of the amplifier 10.

Figure 16:
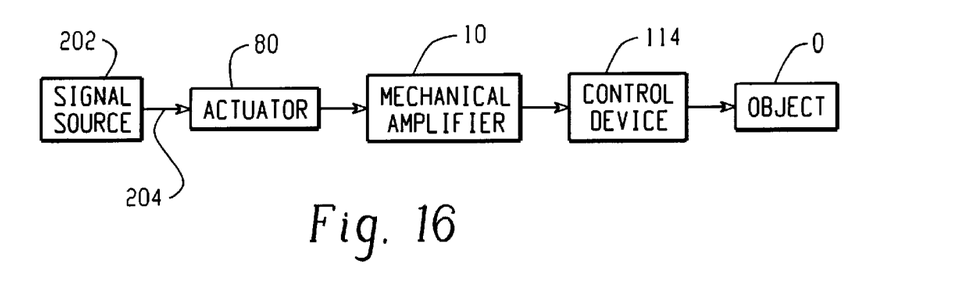
FIG. 16 is a functional block diagram of a system application of the present invention.

FIG. 16 illustrates in functional block diagram form a control system according to the invention. The signal 204 drives the actuators 80 which produce a displacement that is amplified by the mechanical amplifier 10. The amplifier 10 acts either directly on an object "O" to apply force or displacement thereto, or in the example of FIG. 15 the amplifier 10 drives a control device (such as, for example, the pin 114 in FIG. 6) that it turn is connected to the object (such as, for example, the valve N in FIG. 6).

Thus, there has been described herein a mechanical amplifier having an elongated beam rotatable about a virtual pivot point in response to forces applied to opposite sides of the beam by a pair of actuators and further having a frame and a pair of flexures connecting the opposite sides of the beam to the frame and structured to maintain the virtual pivot point of the beam within or near a pivot region defined by the intersection of the axes of the flexures and the actuator forces. The amount of rotation of the beam is proportional to the displacement of the actuators. It will be understood that various changes in the details, arrangements, and configurations of the parts and assemblies which have been described and illustrated above in order to explain the nature of the present invention may be made by those ordinarily skilled in the art within the principle and scope of the present invention. Thus, while the present invention has been described with reference to the presently contemplated best mode for practicing the invention, it is intended that this invention only be limited by the scope of the appended claims.

It is claimed:

1. A mechanical amplifier receiving an input displacement and providing an output displacement proportional to the input displacement comprising:
    a displacement beam having a longitudinal axis, a first side, a second opposite side, a load end and a driven end;
    said driven end of said displacement beam receiving the input displacement at said first and second sides;
    a mechanical ground;
    a first flexure arm having a longitudinal axis and connecting said mechanical ground to said first side of said beam;
    a second flexure arm having a longitudinal axis and connecting said mechanical ground to said second opposite side of said beam;
    said flexure arms and said driven end defining a virtual pivot point about which said beam pivots; and
    said load end of said displacement beam providing the output displacement about the virtual pivot point proportional to the input displacement.

2. The amplifier of claim 1 wherein said longitudinal axes of said first and second flexure arms are substantially coplanar and non-parallel with respect to each other.

3. The amplifier of claim 2 wherein said longitudinal axes of said first and second flexure arms form acute angles with the longitudinal axis of said beam.

4. The amplifier of claim 3 wherein said acute angles are substantially the same.

5. The amplifier of claim 3 further comprising:
    a first mounting pad having a longitudinal axis and connected to said first side of said beam for receiving at least a portion of the input displacement; and
    a second mounting pad having a longitudinal axis and connected to said second side of said beam for receiving at least a portion of the input displacement.

6. The amplifier of claim 5 wherein said longitudinal axes of said first and second mounting pads are substantially coplanar and non-parallel with respect to each other.

7. The amplifier of claim 6 wherein said longitudinal axes of said first and second mounting pads form acute angles with the longitudinal axis of said beam.

8. The amplifier of claim 7 wherein said acute angles are substantially the same.

9. The amplifier of claim 7 wherein said beam has a pivot region defined by the intersection of said longitudinal axes of said first and second flexures and said longitudinal axes of said first and second mounting pads.

10. The amplifier of claim 9 wherein said virtual pivot point lies within or near said pivot region and remains substantially stable within or near said pivot region under load.

11. The amplifier of claim 5 further comprising:
a third mounting pad having a longitudinal axis and connected to said mechanical ground;
a fourth mounting pad having a longitudinal axis and connected to said mechanical ground;
said longitudinal axis of said third mounting pad being substantially coplanar and colinear with said longitudinal axis of said first mounting pad; and
said longitudinal axis of said fourth mounting pad being substantially coplanar and colinear with said longitudinal axis of said second mounting pad.

12. The amplifier of claim 11 in combination with a first and second displacement actuator, said first displacement actuator positioned between said first and third mounting pads for applying an input displacement colinear with said longitudinal axes of said first and third mounting pads, and said second displacement actuator positioned between said second and fourth mounting pads for applying an input displacement colinear with said longitudinal axes of said second and fourth mounting pads.

13. The amplifier of claim 12 wherein said first and second displacement actuators are linear.

14. The amplifier of claim 13 wherein said first and second displacement actuators are multilayer ceramic piezoelectric.

15. The amplifier of claim 1 wherein said mechanical ground comprises:
a first bracket having first and second ends with said first end joined to said beam;
a second bracket having first and second ends with said first end joined to said beam; and
a coupler for joining said second end of said first bracket and said second end of said second bracket.

16. The amplifier of claim 1 wherein a portion of the input displacement is applied to each of said first and second sides of said beam.

17. The amplifier of claim 1 having a natural resonant frequency greater than about 1000 hertz.

18. A control device for receiving an input signal and providing an output displacement proportional to at least one characteristic of the input signal comprising:
a mechanical amplifier having an elongated beam with a longitudinal axis, a first side, a second opposite side, a load end and a driven end;
a first and second displacement actuator, each receiving a portion of the input signal; said first displacement actuator applying a first displacement force to said first side of said beam at said driven end and said second displacement actuator applying a second displacement force to said second side of said beam at said driven end;
first and second flexure arms connected between a mechanical ground and said first and second sides respectively of said beam; and
said beam in response to said first and second displacement forces and said flexure arms pivoting about a virtual pivot point and producing at said load end an output displacement proportional to at least one characteristic of the input signal.

19. The control device of claim 18 wherein said first actuator has a longitudinal axis and said second actuator has a longitudinal axis and said longitudinal axes are substantially coplanar and non-parallel.

20. The control device of claim 19 wherein said longitudinal axis of said first and second actuators form acute angles with the longitudinal axis of said beam.

21. The control device of claim 20 wherein said acute angles are substantially the same.

22. The control device of claim 20 wherein said mechanical amplifier further comprises a mechanical ground connected to said beam.

23. The control device of claim 22 wherein said mechanical amplifier further comprises:
a first flexure arm having a longitudinal axis and connecting said mechanical ground to said first side of said beam;
a second flexure arm having a longitudinal axis and connecting said mechanical ground to said second side of said beam; and
said longitudinal axis of said first and second flexure arms are substantially coplanar and non-parallel.

24. The control device of claim 23 wherein said longitudinal axis of said first and second flexure arms form acute angles with the longitudinal axis of said beam.

25. The control device of claim 24 wherein said acute angles are substantially the same.

26. The control device of claim 24 wherein said beam of said mechanical amplifier has a pivot region defined by the intersection of said longitudinal axes of said first and second flexure arms and said longitudinal axes of said first and second actuators.

27. The control device of claim 26 wherein said virtual pivot lies within said pivot region and remains substantially stable within or near said pivot region under load.

28. The control device of claim 22 wherein said mechanical ground comprises:
a first bracket having first and second ends with said first end joined to said beam;
a second bracket having first and second ends with said first end joined to said beam; and
a coupler for joining said second end of said first bracket and said second end of said second bracket.

29. The control device of claim 18 wherein said first and second displacement actuators are linear.

30. The control device of claim 29 wherein said first and second displacement actuators are multilayer ceramic piezoelectric.

31. The control device of claim 18 wherein said mechanical amplifier has a natural resonant frequency greater than about 1000 hertz.

32. A flow control system comprising:
a mechanical amplifier having an elongated beam having a longitudinal axis, a first side, a second opposite side, a load end and a driven end;
first and second displacement actuators disposed respectively on and connected to said first and second sides of said beam; first and second flexure arms connected to said beam at said first and second sides and to a mechanical ground; said flexure arms being connected to said beam at a position axially spaced from said actuators; said actuators applying displacement forces to said beam driven end to pivot said beam driven end about a virtual pivot point; said beam producing at its load end a proportional displacement of said driven end movement; and a fluid flow control device operatively connected to said beam driven end.

33. The apparatus of claim 32 wherein said flow control device comprises a main body connected to said amplifier and having fluid flow passages therein; and a fluid tight seal between said amplifier and said main body.

34. The invention of claim 33 wherein said seal is compressed into at least partial contact with said beam driven end.

35. A method for mechanically converting an input displacement into an output displacement proportional to the input displacement, comprising the steps of:

a) applying a first portion of the input displacement to a first side of a displacement beam;

b) applying a second portion of the input displacement to a second side of the beam opposite said first side;

c) using a pair of flexure arms to connect the beam on opposite sides thereof to a mechanical ground; and d) using said first and second portions of the applied input displacements to pivot the beam about a virtual pivot point to produce an output displacement proportional to the input displacement.

36. A system receiving an input signal and providing an output for controlling the position of or force applied to an object, comprising:

a mechanical amplifier receiving an input displacement and providing an output displacement about a virtual pivot point proportional to the input displacement and having an elongated beam with a longitudinal axis, a first side, a second opposite side, a load end and a driven end;

a first and second displacement actuator, each having a longitudinal axis and receiving at least a portion of the input signal; said first displacement actuator applying a first input displacement proportional to at least one characteristic of the input signal to said first side of said beam at said driven end and said second displacement actuator applying a second displacement proportional to at least one characteristic of the input signal to said second side of said beam at said driven end;

a mechanical ground and a pair of flexure arms connecting said mechanical ground to said first and second sides of said beam;

said beam in response to said first and second displacements which form said input displacement producing at said load end said output displacement; and a control device connected to said load end of said beam and responsive to said output displacement for controlling the portions of or the force applied to an object.

37. The system of claim 36 wherein said longitudinal axis of said first and second actuators are coplanar wand non-parallel with respect to each other, and said longitudinal axes of said first and second flexures are coplanar and non-parallel with respect to each other.

38. The system of claim 37 wherein said longitudinal axes of said first and second actuators form acute angles with said longitudinal axis of said beam.

39. The system of claim 38 wherein said acute angles are substantially the same.

40. The system of claim 38 wherein said longitudinal axes of said first and second flexures form acute angles with the longitudinal axis of said beam.

41. The system of claim 40 wherein said acute angles are substantially the same.

42. The system of claim 40 wherein said beam has as pivot region defined by the intersection of said longitudinal axes of said first and second actuators and said longitudinal axes of said first and second flexures.

43. The system of claim 42 wherein said virtual pivot point lies within or near said pivot region and remains substantially stable under load.

44. The amplifier of claim 15 wherein said first and second bracket second ends are tapered and said coupler comprises a correspondingly tapered clamp that engages said tapered ends and pulls said second ends towards each other.

* * * * *